United States Patent Office 2,736,745
Patented Feb. 28, 1956

2,736,745

ESTERS AND ACETALS OF 16,17 DIHYDROXY-CYCLOHEXANOPHENANTHREN-3-ONE DERIVATIVES SUBSTITUTED AT 9,11 POSITIONS

William S. Knowles, Kirkwood, Mo., assignor to Monsanto Chemical Company, St. Louis, Mo., a corporation of Delaware No Drawing. Application July 1, 1953,
Serial No. 365,525

16 Claims. (Cl. 260—488)

This invention relates to methods and novel compounds useful in the synthesis of steroidal compounds of the cyclopentanodimethylpolyhydrophenanthrene series. In particular this invention relates to methods and novel compounds useful in the preparation of a 17-formyl-cyclopent-16-eno-10,13 - dimethyl-$\Delta^4$-dodecahydrophenanthren-3,11-dione of the structural formula

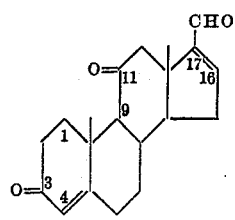

The sequence of steps or series of reactions proceeding to a 17-formyl-cyclopent-16-eno-10,13-dimethyl-$\Delta^4$ dodecahydrophenanthren-3,11-dione of the aforedescribed structural formula for purposes of this invention is outlined schematically in the following diagram from a derivative of a 16,17-dihydroxy-cyclohexano-10,13-dimethyl-$\Delta^{4,9(11)}$-decahydrophenanthren-3-one of the structural formula

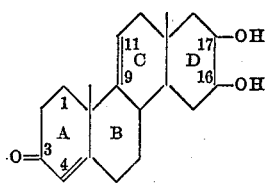

By derivative of said 16,17-glycol is meant to include esters, which may be represented structurally by

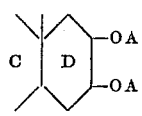

where A is an acyl radical derived from a mono-carboxylic acid such as acetic acid, propionic acid, butyric acid, isobutyric acid, valeric acid, caproic acid, pelargonic acid, myristic acid, stearic acid, phenylacetic acid, hydrocinnamic acid, gamma-phenyl butyric acid, benzoic acid, toluic acid, etc., and cyclic acetals which may be represented structurally by

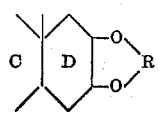

where R is a hydrocarbon residue derived from a hydrocarbon aldehyde or ketone.

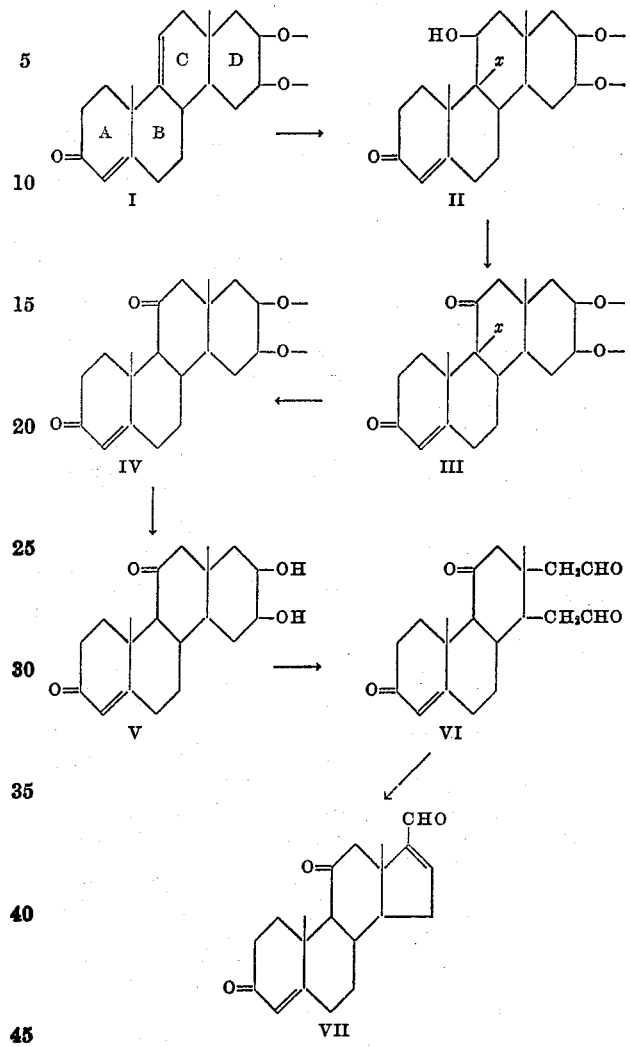

It will be obvious to those skilled in the art that the novel compounds of this invention theoretically exist in $2^n$ optically active isomers where $n$ is the number of asymmetric carbon atoms in the molecule and it is to be understood that all such forms are contemplated. The notation "$\alpha$" and "$\beta$" as used in this specification indicate the spacial configuration of the substituents at positions 16 and 17, respectively, in the structural formulae. It is to be understood that where no notation appears with the name of the compound that the name is to be interpreted in its generic sense, i. e. as representing the individual optically active isomers in separated form as well as racemic mixtures thereof or the total unresolved mixture of isomers or any other combination thereof.

The initial reactant of the process of this invention (Compound I) is derived from a 16,17-dihydroxy-cyclohexano - 10,13-dimethyl -$\Delta^{4,9(11)}$ - decahydrophenathren - 2-one by reacting the latter with either a cyclic acetal forming agent in the presence of a dehydrating cataylst or an acylating agent with or without a condensation catalyst. The preferred cylic acetals of the process of this invention are those obtained from the symmetrical ketones such as acetone, diethyl ketone, cyclohexanone, p-methylcyclohexanone, etc. The preferred esters of the process of this invention are those obtained from the fatty acids and particularly those fatty acids containing from 2 to 4 carbon atoms.

This invention will be described in detail with respect to its preferred embodiment, i. e. the preparation of 3,11-diketo-17-formyl-$\Delta^{4,16}$-androstadiene from an ester or acetal of a 3-keto-16,17-dihydroxy-$\Delta^{4,9(11)}$-D-homoandrostadiene, but it is to be understood that such is not limitative of this invention.

The first step in the process of this invention is the introduction of a halogen substituent in the 9-position and a hydroxy group in the 11-position of a derivative of a 16,17 - dihydroxy - cyclohexano - $\Delta^{4,9(11)}$ - decahydro - phenanthren-3-one (Compound I) to produce the 9-halo-11,16,17 - trihydroxy - cyclohexano - $\Delta^4$ - dodecahydro - phenanthren-3-one (Compound II) of the foregoing schematic diagram, in which $x$ is a halogen atom. This addition reaction may be brought about by mixing a solution of a hypohalous acid, preferably hypobromous acid, with a solution of a cyclic acetal or ester derivative of a 16,17 - dihydroxy - cyclohexano-$\Delta^{4,9(11)}$-decahydrophenanthren-3-one (Compound I) at a temperature in the range of about 0 to 25° C. The 9-halo and 11-hydroxy substituents of the new esters and cyclic acetals bear a trans relationship with respect to one another, i. e. one occupies the plane above ring C while the other occupies the plane below ring C. Although theoretically the hydroxy substituent enters the plane above ring C, it is to be understood that the halo-hydrin product (Compound II) so produced is not limited to any assumption as to chemical structure but pertains broadly to the 9-halo-11-hydroxy addition product of a hypohalous acid and the cyclic acetal or ester derivative of a 16,17-dihydroxy - cyclohexano - $\Delta^{4,9(11)}$ - decahydrophenanthren - 3-one (Compound I). Various solvents which are inert under conditions of the addition reaction can be used in the preparation of the 9-halo-11-hydroxy addition product (Compound II), for example acetone, methyl ethyl ketone, methyl acetate, ethyl acetate, tertiary butanol, etc.

In the first step of the process of this invention it is preferred that the hypohalous acid employed be hypobromous acid and such can be prepared in several ways, for example by mixing mercuric oxide with bromine and water and filtering off the mercuric bromide thus formed, or by mixing N-bromoacetamide with water and tertiary butanol or, preferably, by mixing a solution of N-bromo-succinimide

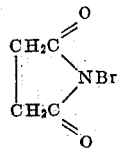

in a suitable inert organic solvent, e. g. acetone, tertiary butanol, with water and a small amount of sulfuric acid. Where desired, the hypobromous acid solution can be prepared first and then mixed with the ester or cyclic acetal reactant (i. e. Compound I) or, preferably the hypobromous acid is prepared in the presence of the ester or cyclic acetal reactant (i. e. Compound I) so that the elements of hypobromous acid add to the 9-11 double bond as soon as they are formed.

As illustrative of the first step of the process of this invention employing hypobromous acid is the following:

*Example I*

To an agitating solution containing substantially 63 parts by weight of $dl$-3-keto-16$\beta$,17$\beta$-dihydroxy-$\Delta^{4,9(11)}$-D-homoandrostadiene di-acetate, substantially 2800 parts by weight of acetone and substantially 1200 parts by weight of water is added at about 0–5° C. approximately 50 parts by weight of 1 N sulfuric acid. To the so cooled and acidified solution is slowly added a solution containing substantially 35 parts by weight of N-bromo-succinimide in approximately 360 parts by weight of acetone. Upon completion of the N-bromo-succinimide addition the mix is agitated for about 5 hours at about 0–5° C., the bromohydrin crystallizes from the solution during the agitation. At the end of the agitation period aqueous sodium sulfite is added to destroy the excess N-bromo-succinimide and then the mix is neutralized with sodium bicarbonate. The mix is then filtered and the residue washed first with water, then with acetone and dried. The product so obtained is $dl$-3-keto-9-bromo-11,16$\beta$,17$\beta$-trihydroxy-$\Delta^4$-D-homoandrostene di-acetate.

Although $dl$-3-keto-9-chloro-11,16$\beta$,17$\beta$-trihydroxy-$\Delta^4$-D-homoandrostene di-acetate may be prepared in a similar manner employing reactants which provide a source of hypochlorous acid, it is preferred that it be prepared indirectly. For example, by admixing the bromo-hydrin (i. e. the product of Example I) with a small amount of potassium acetate and boiling the mix in alcohol to effect formation of the 9,11-oxido derivative, the oxido compound so obtained upon reacting with hydrochloric acid in chloroform at about 0–5° C. yields $dl$-3-keto-9-chloro - 11,16$\beta$,17$\beta$ - trihydroxy - $\Delta^4$ - D - homoandrostene di-acetate. In a similar fashion $dl$-3-keto-9-iodo-11,16$\beta$,17$\beta$-trihydroxy-$\Delta^4$-D-homoandrostene di-acetate is obtained by the employment of hydriodic acid instead of hydrochloric acid.

*Example II*

Employing the procedure of Example I but replacing $dl$ - 3 - keto - 16$\beta$,17$\beta$ - dihydroxy - $\Delta^{4,9(11)}$ - D - homo - androstadiene di-acetate with an equimolecular amount of $dl$ - 3 - keto - 16$\alpha$,17$\alpha$ - dihydroxy - $\Delta^{4,9(11)}$ - D - homo - androstadiene acetonide an excellent yield of a white crystalline material identified as $dl$-3-keto-9-bromo-11,16-$\alpha$,17$\alpha$-trihydroxy-$\Delta^4$-D-homoandrostene acetonide is obtained.

*Example III*

Employing the procedure of Example I but replacing $dl$ - 3 - keto - 16$\beta$,17$\beta$-dihydroxy - $\Delta^{4,9(11)}$ - D - homo - androstadiene di-acetate with an equimolecular amount of $dl$ - 3 - keto - 16$\alpha$,17$\alpha$ - dihydroxy - $\Delta^{4,9(11)}$ - D - homo - androstadiene di-acetate there is obtained $dl$-3-keto-9-bromo - 11,16$\alpha$,17$\alpha$ - trihydroxy - $\Delta^4$ - D - homoandrostene di-acetate.

In a similar fashion the individual optically active isomers such as the natural modification of 3-keto-9-bromo - 11,16$\alpha$,17$\alpha$ - trihydroxy - $\Delta^4$ - D - homoandrostene di-acetate and acetonide are obtained from the corresponding optically active isomers of 3-keto-16$\alpha$,17$\alpha$-dihydroxy-$\Delta^{4,9(11)}$-D-homoandrostadiene di-acetate and acetonide respectively.

$dl$ - 3 - keto - 9 - chloro - 11,16$\alpha$,17$\alpha$ - trihydroxy - $\Delta^4$-D-homoandrostene diacetate is obtained by mixing $dl$ - 3 - keto - 9 - bromo - 11,16$\alpha$,17$\alpha$ - trihydroxy - $\Delta^4$ - D-homoandrostene di-acetate with a small amount of potassium acetate, boiling the mixture in alcohol to effect formation of the 9,11-oxido derivative, then reacting the oxido compound with hydrochloric acid in chloroform at about 0° C.

*Example IV*

To an agitating solution containing substantially 63 parts by weight of $dl$-3-keto-16$\alpha$,17$\beta$-dihydroxy-$\Delta^{4,9(11)}$-D-homoandrostadiene di-acetate, substantially 2800 parts by weight of acetone and substantially 1100 parts by weight of water is added at about 0–5° C. approximately 50 parts by weight of 1 N sulfuric acid. To the so cooled and acidified solution is slowly added a solution containing substantially 35 parts by weight of N-bromo-succinimide in approximately 360 parts by weight of acetone. Upon completion of the N-bromo-succinimide addition the mix is agitated for about 5 hours at about 0–5° C., the bromo-hydrin crystallizes from the solution during the agitation. At the end of the agitation period sodium sulfite is added to destroy the excess N-bromo-succinimide and then the mix is neutralized with sodium bicarbonate. The mix is then filtered and the residue washed first with water, then with acetone and dried. The product so obtained is dl-3-keto-9-bromo-11,16α,17β-trihydroxy-Δ⁴-D-homoandrostene di-acetate.

dl - 3 - keto - 9 - chloro - 11,16α,17β - trihydroxy - Δ⁴-D-homoandrostene di-acetate is obtained by admixing the bromo-hydrin of Example IV with a small amount of potassium acetate and boiling the mixture in alcohol to effect formation of the 9,11-oxido derivative, then reacting the oxido compound so formed with hydrochloric acid in chloroform at about 0° C.

*Example V*

Employing the procedure of Example IV but replacing dl - 3 - keto - 16α,17β - dihydroxy - Δ⁴,⁹⁽¹¹⁾ - D - homoandrostadiene di-acetate with an equimolecular amount of dl - 3 - keto - 16α,17β - dihydroxy - Δ⁴,⁹⁽¹¹⁾ - D - homoandrostadiene di-propionate there is obtained dl-3-keto-9-bromo - 11,16α,17β - trihydroxy - Δ⁴ - D - homoandrostene di-propionate.

*Example VI*

Employing the procedure of Example IV but replacing dl - 3 - keto - 16α,17β - dihydroxy - Δ⁴,⁹⁽¹¹⁾ - D - homo - androstadiene di-acetate with an equimolecular amount of the natural modification of 3-keto-16α,17β-dihydroxy-Δ⁴,⁹⁽¹¹⁾-D-homoandrostadiene di-acetate there is obtained the natural modification of 3-keto-9-bromo-11,16α,17β-trihydroxy-Δ⁴-D-homoandrostene di-acetate.

The natural modification of 3-keto-9-chloro-11,16α,17β-trihydroxy-Δ⁴-D-homoandrostene di-acetate is obtained by admixing the bromo-hydrin of Example VI with a small amount of potassium acetate and boiling the mixture in alcohol to effect formation of the 9,11-oxido derivative, then reacting the oxido compound so formed with hydrochloric acid in chloroform at about 0° C. Similarly, by replacing hydrochloric acid with hydriodic acid the natural modification of 3-keto-11,16α,17β-trihydroxy-9-iodo-Δ⁴-D-homoandrostene di-acetate is obtained.

The next step in the process of this invention is the oxidation of the 11-hydroxy substituent of Compound II of the foregoing schematic diagram to produce the 3,11-diketo-9-halo-16,17-dihydroxy-Δ⁴-D-homoandrostene ester or acetal (Compound III)

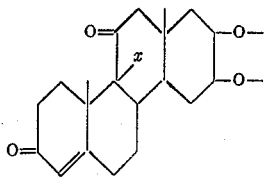

where $x$ is a halogen atom such as bromine, chlorine and iodine. This oxidation step is brought about in an anhydrous system by mixing a complex of chromium oxide and a tertiary amine, such as pyridine or the various picolines, etc., with the 9-halo-11-hydroxy compound (Compound II). As illustrative of this step of the process of this invention is the following.

*Example VII*

To an agitated complex of chromium trioxide and pyridine prepared in the cold by admixing 50 parts by weight of chromium trioxide with 500 parts by weight of pyridine is added substantially 50 parts by weight of dl - 3 - keto - 9 - bromo - 11,16α,17α - trihydroxy - Δ⁴ - D-homoandrostene di-acetate in approximately 800 parts by weight of pyridine while maintaining the temperature at about 10° C. The mixture so obtained is permitted to stand at room temperature for about 16 hours with occasional agitation. The mixture is then filtered and the residue washed with pyridine. The pyridine wash and the original filtrate are combined and the solution so formed is poured into five times its weight of water and the composite extracted with chloroform. The extracts are combined and cooled to about 0° C. The cooled solution is then washed with dilute hydrochloric acid and then with water. The organic layer is recovered, dried, and subjected to evaporation under vacuum. A good yield of white solid dl-3,11-diketo-9-bromo16α,17α-dihydroxy-Δ⁴-D-homoandrostene di-acetate is obtained.

Employing the process of Example VII but replacing the di-acetate reactant with an equimolar amount of dl-3 - keto - 9 - bromo - 11,16α,17α - trihydroxy - Δ⁴ - D - homoandrostene acetonide a good yield of white solid dl-3,11 - diketo - 9 - bromo - 16α,17α - dihydroxy - Δ⁴ - homoandrostene acetonide is obtained.

Replacing dl - 3 - keto - 9 - bromo - 11,16α,17α - trihydroxy-Δ⁴-D-homoandrostene di-acetate in Example VII with an equal weight of dl-3-keto-9-bromo-11,16β,17β-trihydroxy-Δ⁴-D-homoandrostene di-acetate and subjecting same to the series of steps set forth in Example VII an excellent yield of white solid dl-3,11-diketo-9-bromo-16β,17β-dihydroxy-Δ⁴-D-homoandrostene di-acetate is obtained. In a similar fashion the natural modification of, respectively, 3,11 - diketo - 9 - bromo - 16β,17β - dihydroxy-Δ⁴-D-homoandrostene di-acetate and 3,11-diketo-9-bromo - 16α,17α - dihydroxy - Δ⁴ - D - homoandrostene di-acetate are obtained by the oxidation of the corresponding bromo-hydrin. The white solid dl and individually optically active isomers of 3,11-diketo-9-chloro-16β,17β-dihydroxy-Δ⁴-D-homoandrostene di-acetate and the white solid dl and individually optically active isomers of 3,11-diketo - 9 - chloro - 16α,17α - dihydroxy - Δ⁴ - D - homoandrostene di-acetate are obtained from the oxidation of corresponding chloro-hydrin (Compound II).

*Example VIII*

To an agitated complex of chromium trioxide and pyridine prepared in the cold by admixing 25 parts by weight of chromium trioxide with 250 parts by weight of pyridine is added substantially 25 parts by weight of dl-3-keto-9-bromo-11,16α,17β-trihydroxy-Δ⁴-D-homoandrostene di-acetate in approximately 400 parts by weight of pyridine while maintaining the temperature at about 10° C. The mixture so obtained is permitted to stand at room temperature for about 16 hours with occasional agitation. The mixture is then filtered and the residue washed with pyridine. The pyridine wash and the original filtrate are combined and the solution so formed is poured into five times its weight of water and the composite extracted with chloroform. The extracts are combined and cooled to about 0° C. The cooled solution is then washed with dilute hydrochloric acid and then with water. The organic layer is recovered, dried, and subjected to evaporation under vacuum. A good yield of a crystalline material identified as dl-3,11-diketo-9-bromo-16α,17β-dihydroxy-Δ⁴-D-homoandrostene di-acetate is obtained. In a similar fashion the individual optically active isomers of 3,11 - diketo - 9 - bromo - 16α,17β - dihydroxy - Δ⁴ - D - homoandrostene di-acetate are obtained by the oxidation of the corresponding bromo-hydrin. The individual optically active isomers of 3,11-diketo-9-chloro-16α,17β-dihydroxy-Δ⁴-D-homoandrostene di-acetate are obtained from the oxidation of the corresponding chloro-hydrin (Compound II).

The next step in the process of this invention is the preparation of the 3,11-diketo-16,17-dihydroxy-Δ⁴-D-homoandrostene ester of acetal (Compound IV) by removal of the halogen atom in the 9-position of the haloketone (Compound III), namely the 3,11-diketo-9-halo-16,17-dihydroxy-Δ⁴-D-homoandrostene ester or acetal. The 9-halogen substituent may be removed by the employment of a metallic reducing agent such as nickel, zinc, etc., and as illustrative thereof is the following:

*Example IX*

To an agitated solution containing substantially 40 parts by weight of dl-3,11-diketo-9-bromo-16α,17α-dihydroxy-Δ⁴-D-homoandrostene di-acetate, approximately 3000 parts by weight of glacial acetic acid and approximately 1000 parts by weight of water is added approximately 7 parts by weight of zinc dust. The mixture so obtained is agitated at about 15° C. for about 10 minutes. The mix is then filtered and the filtrate is admixed with an equal volume of water and the mix so obtained extracted with several portions of diethyl ether. The ether extracts are combined, washed with water, followed by a sodium carbonate wash and finally with water. The organic solution is then dried and evaporated. A good yield of white solid $dl$-3,11-diketo-16$\alpha$,17$\alpha$-dihydroxy-$\Delta^4$-D-homoandrostene di-acetate is obtained.

Similarly, beginning with the acetonide instead of the di-acetate, a good yield of white solid $dl$-3,11-diketo-16$\alpha$,17$\alpha$-dihydroxy-$\Delta^4$-D-homoandrostene acetonide is obtained.

Employing the same procedure as in Example IX but replacing $dl$-3,11-diketo - 9-bromo-16$\alpha$,17$\alpha$-dihydroxy-$\Delta^4$-D-homoandrostene di-acetate with an equimolar amount of $dl$-3,11-diketo-9-bromo-16$\beta$,17$\beta$-dihydroxy-$\Delta^4$-D-homoandrostene di-acetate (or acetonide) an excellent yield of $dl$-3,11-diketo-16$\beta$,17$\beta$-dihydroxy-$\Delta^4$-D - homoandrostene di-acetate (or acetonide) is obtained. In a similar fashion the individual optically active isomers of 3,11-diketo-16$\alpha$,17$\alpha$-dihydroxy-$\Delta^4$-D-homoandrostene di-acetate (or acetonide) and the individual optically active isomers of 3,11-diketo-16$\beta$,17$\beta$-dihydroxy-$\Delta^4$-D - homoandrostene di-acetate (or acetonide) are obtained from the corresponding optically active bromo-ketone (Compound IIII).

Example X

To an agitated solution containing substantially 40 parts by weight of $dl$-3,11-diketo-9-bromo-16$\alpha$,17$\beta$-dihydroxy-$\Delta^4$-D-homoandrostene di-acetate, approximately 2900 parts by weight of glacial acetic acid and approximately 1000 parts by weight of water is added approximately 72 parts by weight of zinc dust. The mixture so obtained is agitated at about 15° C. for about 10 minutes. The mix is then filtered and the filtrate is admixed with an equal volume of water and the mix so obtained extracted with several portions of diethyl ether. The ether extracts are combined, washed with water, followed by a sodium carbonate wash and finally with water. The organic solution is then dried and evaporated. A good yield of $dl$-3,11-diketo-16$\alpha$,17$\beta$-dihydroxy-$\Delta^4$-D-homoandrostene di-acetate is obtained.

In a similar fashion the individual optically active isomers as for example the natural modification of 3,11-diketo-16$\alpha$,17$\beta$-dihydroxy-$\Delta^4$-D-homoandrostene di - acetate are obtained from the corresponding optically active bromo-ketone (Compound III).

The next step in the process of this invention is the preparation of the free glycol (Compound V) by way of hydrolysis. The ester is hydrolyzed with dilute alkali such as sodium hydroxide, potassium hydroxide, etc., to the corresponding glycol while the cyclic acetal is hydrolyzed with dilute mineral acid. As illustrative of this step is the following.

Example XI

Substantially 50 parts by weight of $dl$-3,11-diketo-16$\alpha$,17$\alpha$-dihydroxy-$\Delta^4$-D-homoandrostene di-acetate is dissolved in warm dioxane. Thereto is added while agitating approximately 10 parts by weight of 5 percent sodium hydroxide and the solution allowed to cool. The agitation is stopped and the solution set on an ice bath. The so cooled mix is filtered, washed with water and dried. A substantially quantitative yield of white crystalline $dl$-3,11-diketo-16$\alpha$,17$\alpha$-dihydroxy-$\Delta^4$-D - homoandrostene is obtained.

Similarly white solid $dl$-3,11-diketo-16$\beta$,17$\beta$-dihydroxy-$\Delta^4$-D-homoandrostene is obtained by the alkali hydrolysis of $dl$-3-11-diketo-16$\beta$,17$\beta$-dihydroxy-$\Delta^4$-D - homoandrostene di-acetate. Also the individual optically active isomers, e. g. the natural modification of 3,11-diketo-16$\alpha$,17$\alpha$-dihydroxy-$\Delta^4$-D-homoandrostene and 3,11-diketo-16$\beta$,17$\beta$-dihydroxy-$\Delta^4$-D-homoandrostene, respectively, are obtained by the alkali hydroylsis of the corresponding optically active ester (Compound IV).

Example XII

Substantially 50 parts by weight of $dl$-3,11 - diketo-16$\alpha$,17$\beta$-dihydroxy-$\Delta^4$-D-homoandrostene di-acetate is dissolved in warm dioxane. Thereto is added while agitating approximately 10 parts by weight of 5 percent sodium hydroxide and the solution allowed to cool. The agitation is stopped and the solution set on an ice bath. The so cooled mix is filtered, washed with water and dried. A substantially quantitative yield of white solid $dl$-3,11-diketo-16$\alpha$,17$\beta$-dihydroxy-$\Delta^4$-D - homoandrostene is obtained.

Similarly the individual optically active isomers 3,11-diketo-16$\alpha$,17$\beta$-dihydroxy-$\Delta^4$-D-homoandrostene are obtained by the alkali hydroylsis of the corresponding ester (Compound IV).

Example XIII

Substantially 50 parts by weight of $dl$-3,11-diketo-16$\alpha$,17$\alpha$-dihydroxy-$\Delta^4$-D-homoandrostene acetonide is dissolved in warm dioxane. Thereto is added while agitating approximately 10 parts by weight of 5 percent hydrochloric acid and the solution allowed to cool. The agitation is stopped and the solution set on an ice bath. The so cooled mix is filtered, washed with water and dried. A substantially quantitative yield of a white crystalline product identified as $dl$-3,11-diketo-16$\alpha$,17$\alpha$-dihydroxy-$\Delta^4$-D-homoandrostene is obtained.

Similarly white crystalline $dl$-3,11-diketo-16$\beta$,17$\beta$-dihydroxy-$\Delta^4$-D-homoandrostene is obtained by the acid hydrolysis of $dl$-3,11-diketo-16$\beta$,17$\beta$-dihydroxy-$\Delta^4$ - D-homoandrostene acetonide.

In the next step the glycol (Compound V) is oxidized to form the dialdehyde (Compound VI), which dialdehyde is preferably not recovered but converted directly to 3,11-diketo-17-formyl-$\Delta^{4,16}$ - androstadiene (Compound VII) by treating with ammonium acetate or an amine acetate in the presence of an inert organic solvent such as benzene, toluene, xylene and the like. This procedure is described in my co-pending application Serial No. 355,399, filed May 15, 1953. As illustrative of these steps is the following:

Example XIV 45 parts by weight of $dl$-3,11-diketo-16$\alpha$,17$\alpha$-dihydroxy-$\Delta^4$-D-homoandrostene is dissolved in 2000 parts by weight of dioxane. Thereto is added a solution of 45 parts by weight of periodic acid dihydrate in 800 parts by weight of water. The mix so obtained is agitated at 0° C. under an atmosphere of nitrogen for 14 hours. Thereupon the dioxane is distilled off under reduced pressure and the residue taken up with water. The aqueous phase is then extracted with several 100 parts by weight portions of ether. The ether extracts are combined and washed with a 5% aqueous sodium carbonate solution. The organic layer is then dried over magnesium sulfate and filtered. Upon removing the ether from the filtrate so obtained the residue is dissolved in 2500 parts by weight of benzene. To the solution so obtained is added 20 parts by weight of acetic acid and 10 parts by weight of piperidine and the mix so obtained heated at 60° C. for one hour in an atmosphere of nitrogen. The resultant mix is cooled and washed successively with 5% hydrochloric acid, 5% aqueous sodium carbonate, and finally with water. The benzene layer is then dried over magnesium sulfate and filtered. The solution is evaporated to dryness and upon recrystallizing the residue from benezene there is obtained 28 parts by weight of white crystalline $dl$-3,11-diketo-17-formyl-$\Delta^{4,16}$-androstadiene.

The aforedescribed $dl$-3,11-diketo-17-formyl-$\Delta^{4,16}$-androstadiene is obtained from respectively, $dl$-3,11-diketo-16$\beta$,17$\beta$- and $dl$-3,11-diketo-16$\alpha$,17$\beta$ - dihydroxy - $\Delta^4$ - D- homoandrostene by oxidation of the 16,17-glycol to the dialdehyde (Compound VI) and ring closing with piperidine acetate. In a similar fashion the optically active isomers such as the natural modification of 3,11-diketo-17-formyl-Δ4,16-androstadiene are obtained from the corresponding isomer of 3,11-diketo-16α,17α- or 3,11-diketo-16β,17β- or 3,11-diketo-16α,17β-dihydroxy-Δ4-D-homoandrostene.

It is to be understood that the optically active isomers referred to herein as the "natural modification" are those isomers which have the same configuration about their asymmetric centers as the asymmetric centers of the adrenal cortical hormones which are common to both.

It is to be understood that the invention is not limited to the exact details of operation of the compounds shown and described, since obvious modifications and equivalents will be apparent to those skilled in the art and are to be construed to be within the spirit and scope of this invention.

This application is a continuation-in-part of my copending application Ser. No. 355,399, filed May 15, 1953.

What is claimed is:

1. Compounds selected from the group consisting of esters of 16,17-dihydroxy-cyclohexano-10,13-dimethyl-9-halo - 11 - hydroxy-Δ4-dodecahydrophenanthren-3-one of the structural formula

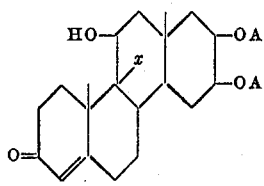

and acetals of 16,17-dihydroxy-cyclohexano-10,13-dimethyl-9-halo-11-hydroxy-Δ4 - dodecahydrophenanthren-3-one of the structural formula

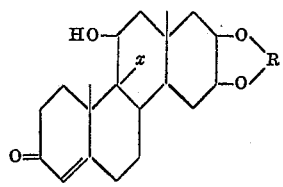

where in the foregoing structural formulae A is an acyl radical obtained upon removal of the hydroxy group of the carboxyl group of a mono-carboxylic acid selected from the group consisting of saturated fatty acids, phenylacetic acid, hydrocinnamic acid, gamma-phenyl butyric acid, benzoic acid and toluic acid, where R is a hydrocarbon residue obtained upon removal of the oxygen atom of a symmetrical ketone selected from the class consisting of acetone, diethyl ketone, cyclohexanone and p-methyl-cyclohexanone, and where the 9-halo substituent x is selected from the group consisting of chlorine, bromine and iodine.

2. An ester of 3-keto-9-halo-11,16,17-trihydroxy-Δ4-D-homoandrostene of the structural formula

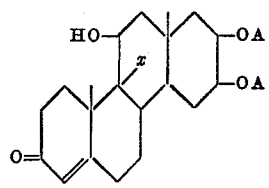

where x is a bromine atom and where A is an acyl radical obtained upon removal of the hydroxy group of the carboxyl group of a saturated lower fatty acid.

3. The ester of claim 2 wherein A is an acyl radical obtained upon removal of the hydroxy group of the carboxyl group of a saturated fatty acid containing 2 to 4 carbon atoms.

4. The ester of claim 2 wherein A is acetyl.

5. Compounds selected from the group consisting of esters of 16,17-dihydroxy-cyclohexano-10,13-dimethyl-9-halo-Δ4-dodecahydrophenanthren-3,11-dione of the structural formula

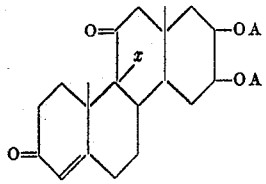

and acetals of 16,17-dihydroxy-cyclohexano-10,13-dimethyl-9-halo-Δ4-dodecahydrophenanthren-3,11-dione of the structural formula

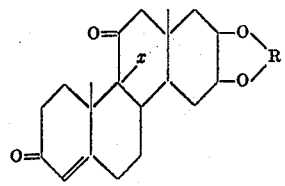

wherein the foregoing structural formula A is an acyl radical obtained upon removal of the hydroxy group of the carboxyl group of a mono-carboxylic acid selected from the group consisting of saturated fatty acids, phenylacetic acid, hydrocinnamic acid, gamma-phenyl butyric acid, benzoic acid and toluic acid, where R is a hydrocarbon residue obtained upon removal of the oxygen atom of a symmetrical ketone selected from the class consisting of acetone, diethyl ketone, cyclohexanone and p-methyl-cyclohexanone, and where the 9-halo substituent x is selected from the group consisting of chlorine, bromine and iodine.

6. An ester of 3,11-diketo-9-halo-16,17-dihydroxy-Δ4-D-homoandrostene of the structural formula

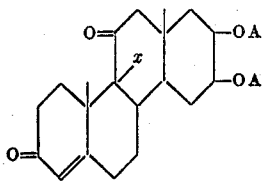

where x is a bromine atom and where A is an acyl radical obtained upon removal of the hydroxy group of the carboxyl group of a saturated lower fatty acid.

7. The ester of claim 6 wherein A is an acyl radical obtained upon removal of the hydroxy group of the carboxyl group of a saturated fatty acid containing 2 to 4 carbon atoms.

8. The ester of claim 6 where A is acetyl.

9. Compounds selected from the group consisting of esters of 16,17-dihydroxy-cyclohexano-10,13-dimethyl-Δ4-dodecahydrophenanthren-3,11-dione of the structural formula

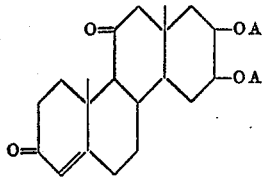

and acetals of 16,17-dihydroxy-cyclohexano-10,13-Δ4-dodecahydrophenanthren-3,11-dione of the structural formula

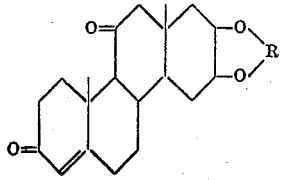

wherein the foregoing structural formulae A is an acyl radical obtained upon removal of the hydroxy group of the carboxyl group of a mono-carboxylic acid selected from the group consisting of saturated fatty acids, phenylacetic acid, hydrocinnamic acid, gamma-phenyl butyric acid, benzoic acid and toluic acid, and where R is a hydrocarbon residue obtained upon removal of the oxygen atom of a symmetrical ketone selected from the class consisting of acetone, diethyl ketone, cyclohexanone and p-methylcyclohexanone.

10. An ester of 3,11-diketo-16,17-dihydroxy-Δ⁴-D-homoandrostene of the structure

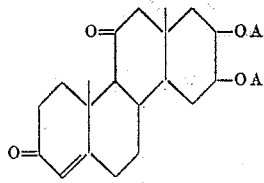

where A is an acyl radical obtained upon removal of the hydroxy group of the carboxyl group of a saturated lower fatty acid.

11. The ester of claim 10 wherein the fatty acid contains from 2 to 4 carbon atoms.

12. The ester of claim 10 wherein the fatty acid is acetic acid.

13. As a new compound a 16,17-dihydroxy-cyclohexano - 10,13 - dimethyl-Δ⁴-dodecahydrophenanthren-3,11-dione of the structural formula

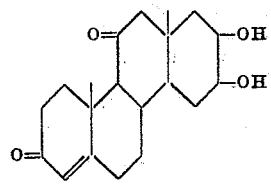

14. 3,11-diketo-16,17-dihydroxy-D-homoandrostene.

15. 3,11-diketo-16α,17β-dihydroxy-D-homoandrostene.

16. The process of making 3,11-diketo-16,17-dihydroxy-Δ⁴-D-homoandrostene which comprises (a) reacting hypobromous acid with a di-ester of 3-keto-16,17-dihydroxy-Δ⁴,⁹⁽¹¹⁾-D-homoandrostadiene, (b) oxidizing the 9-bromo-11-hydroxy addition product so obtained in an anhydrous medium with a complex of chromium oxide and pyridine, (c) admixing the oxidized product so obtained with zinc and acetic acid to remove the bromine substituent effecting formation of a di-ester of 3,11-diketo-16,17-dihydroxy-Δ⁴-D-homoandrostene, (d) and hydrolyzing the di-ester with alkali.

References Cited in the file of this patent
UNITED STATES PATENTS

| | | |
|---|---|---|
| 2,324,881 | Ruzicka et al. | July 20, 1943 |
| 2,351,637 | Ruzicka et al. | June 20, 1944 |
| 2,357,364 | Stavely | Sept. 5, 1944 |
| 2,563,247 | Kendall | Aug. 7, 1951 |
| 2,672,482 | Woodward | Mar. 16, 1954 |
| 2,707,190 | Farrar | Apr. 16, 1955 |

OTHER REFERENCES

Barkley et al.: J. Am. Chem. Soc. 76 (1954), 5017–9.